(12) United States Patent
Suzuki

(10) Patent No.: US 12,434,387 B2
(45) Date of Patent: Oct. 7, 2025

(54) PART HOLDING JIG, ROBOT SYSTEM, AND PART MOUNTING METHOD

(71) Applicant: FANUC CORPORATION, Yamanashi (JP)

(72) Inventor: Tadanori Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 197 days.

(21) Appl. No.: 18/015,663

(22) PCT Filed: Jul. 21, 2021

(86) PCT No.: PCT/JP2021/027252
§ 371 (c)(1),
(2) Date: Jan. 11, 2023

(87) PCT Pub. No.: WO2022/024897
PCT Pub. Date: Feb. 3, 2022

(65) Prior Publication Data
US 2023/0302649 A1    Sep. 28, 2023

(30) Foreign Application Priority Data
Jul. 27, 2020 (JP) .................................. 2020-126664

(51) Int. Cl.
*B25J 9/16* (2006.01)
*B25J 9/00* (2006.01)
*B25J 15/04* (2006.01)

(52) U.S. Cl.
CPC ........... *B25J 9/1682* (2013.01); *B25J 9/0096* (2013.01); *B25J 15/04* (2013.01)

(58) Field of Classification Search
CPC ........ B25J 9/1682; B25J 9/0096; B25J 15/04; B25J 15/0095; B25J 9/0084
See application file for complete search history.

(56) References Cited

U.S. PATENT DOCUMENTS 11,020,787 B2 *   6/2021   Sato ....................... B21D 43/26
11,628,963 B2 *   4/2023   Nishio .................. B65B 43/285
                                                                  53/564

(Continued)

FOREIGN PATENT DOCUMENTS

| JP | H5-27274 Y2 | 7/1993 |
| JP | 2000-94147 A | 4/2000 |
| JP | 2010-89228 A | 4/2010 |

OTHER PUBLICATIONS

International Search Report issued in PCT/JP2021/027252 mailed on Oct. 19, 2021 with English Translation (5 pages).

(Continued)

*Primary Examiner* — Sihar A Karwan
(74) *Attorney, Agent, or Firm* — Nakanishi IP Associates, LLC

(57) ABSTRACT

A robot system includes a part supply robot for supplying a part to a workpiece. A tip of an arm of the part supply robot is equipped with a master plate of a tool changer. A part holding jig includes a tool plate detachably attached to the master plate, a pull/release mechanism pulled onto and released from the workpiece in accordance with an operation via the master plate, and a part pressing mechanism coupled to the pull/release mechanism for pressing the part against the workpiece in a state where the pull/release mechanism is pulled onto the workpiece.

6 Claims, 9 Drawing Sheets

(56) References Cited

U.S. PATENT DOCUMENTS

| | | | | |
|---|---|---|---|---|
| 11,884,377 B2* | 1/2024 | Oberoi | ............... | B64C 1/14 |
| 2010/0092273 A1* | 4/2010 | Oda | ............... | B25J 9/046 |
| | | | | 414/728 |
| 2012/0209415 A1* | 8/2012 | Casanelles | ............... | B25J 19/06 |
| | | | | 901/44 |
| 2015/0217359 A1* | 8/2015 | Segura Golorons | ... | B21D 43/22 |
| | | | | 414/790.9 |
| 2018/0071808 A1* | 3/2018 | Viñuales Duesa | ..... | B25J 9/0096 |
| 2019/0223963 A1* | 7/2019 | Gorelik | ............... | A61B 34/70 |
| 2019/0291225 A1* | 9/2019 | Makis | ............... | B25J 11/005 |
| 2020/0230687 A1* | 7/2020 | Takeda | ............... | B21D 43/105 |

OTHER PUBLICATIONS

Written Opinion of the International Searching Authority issued in PCT/JP2021/027252 mailed on Oct. 19, 2021 with English Translation (5 pages).

* cited by examiner

PART HOLDING JIG, ROBOT SYSTEM, AND PART MOUNTING METHOD

TECHNICAL FIELD

This disclosure relates generally to a part holding jig, a robot system, and a part mounting method.

BACKGROUND

When a part is welded to a base material by arc welding or the like, the part is often held at a mounting position by a clamping jig or the like so that the part does not move relative to the base material. When a part is welded to a base material having a complicated shape such as an automobile body, the base material itself between the clamping position and the welding position becomes an interfering object. Further, when a part P is welded to a large base material W, there arises a problem that a clamping jig 900 cannot clamp the part P to the base material W or, even if it can clamp it, it cannot clamp it firmly because the distance between the clamping position and the welding position is long (see FIG. 16). As described above, the clamping jig 900 may limit the places where welding can be performed.

Further, some robot arms are equipped with a mechanism for supplying a part and a mechanism for pressing the part in addition to a welding torch, as an end effector at the tip of the robot arm. However, this makes the structure of the end effector complicated, and moreover, inevitably makes the size of the end effector larger, which not only increases the cost of the end effector, but also limits the places where welding can be performed because the end effector interferes with the base material.

CITATION LIST

Patent Literature

Patent Literature 1: Japanese Unexamined Patent Application Publication No. 2010-89228

DETAILED DESCRIPTION

Figure 1:
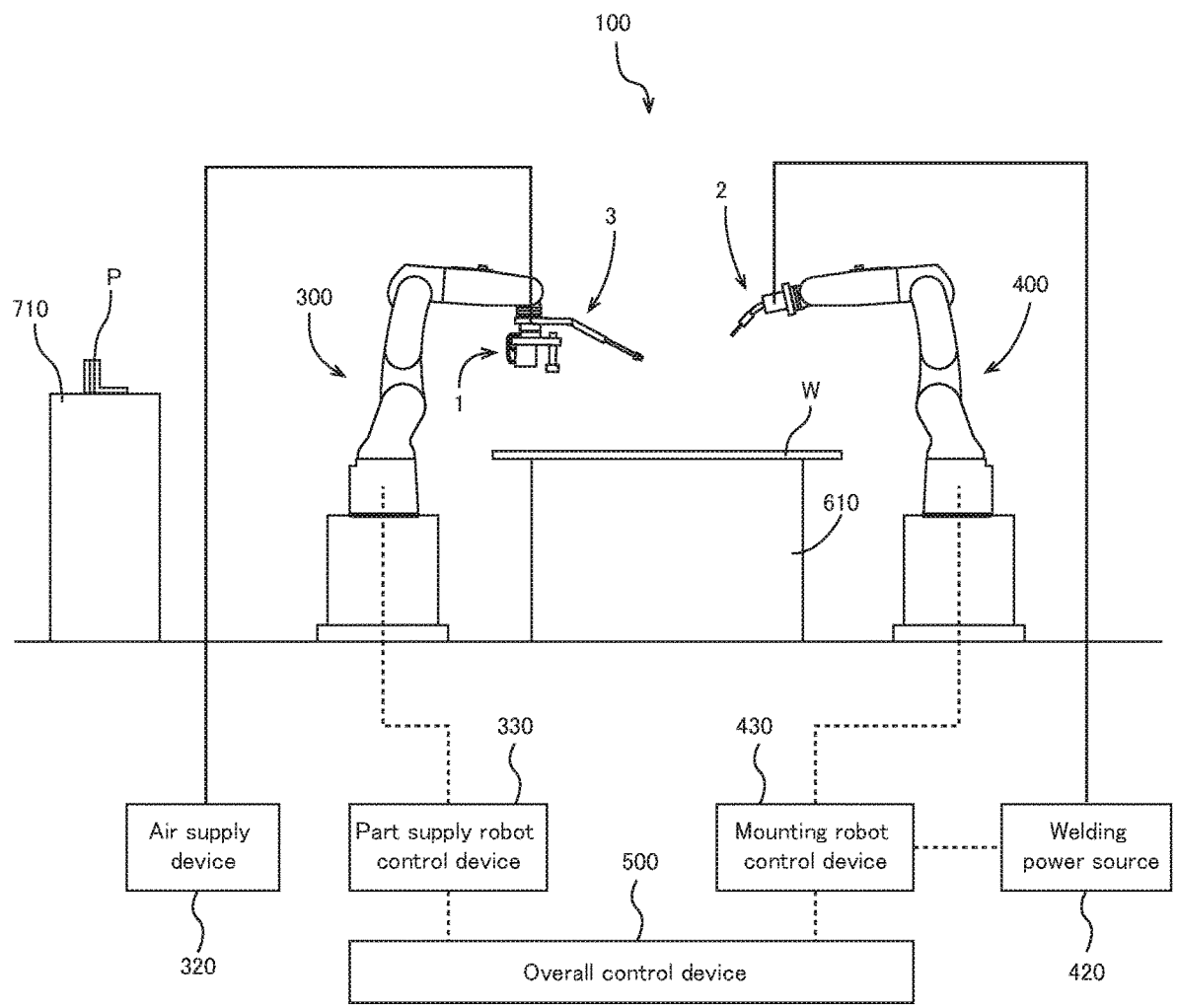
FIG. 1 is a side view showing a robot system according to the present embodiment.

A robot system according to one aspect of the present disclosure comprises a part supply robot for supplying a part to a workpiece, a part holding jig for holding the supplied part at a mounting position with respect to the workpiece, and a mounting robot for mounting the part held at the mounting position on the workpiece. A tip of an arm of the part supply robot is equipped with a master plate of a tool changer. The part holding jig includes a tool plate detachably attached to the master plate, a pull/release mechanism pulled onto and released from the workpiece in accordance with an operation via the master plate, and a part pressing mechanism coupled to the pull/release mechanism for pressing the part against the workpiece in a state where the pull/release mechanism is pulled onto the workpiece.

Hereinafter, a robot system according to the present embodiment will be described with reference to the drawings. In the following description, constituent elements having substantially the same function and configuration are denoted by the same reference numeral, and a repetitive description will be given only where necessary.

As shown in FIG. 1, a robot system 100 includes a part supply robot 300 for supplying a part P to a workpiece W, a part holding jig 1 for holding the supplied part P at a mounting position on the workpiece W, and a mounting robot 400 for mounting the part P held at the mounting position on the workpiece W.

The part supply robot 300 and the mounting robot 400 are arranged on both sides of a work table 610 on which the workpiece W is placed. In the vicinity of the part supply robot 300, a part supply table 710 on which the part P is placed is disposed.

The part supply robot 300 has an articulated arm mechanism. The tip of the arm of the part supply robot 300 is equipped with a part gripping hand 3 for gripping the part P and a master plate 4M of a tool changer 4. The tool plate 4T of the tool changer 4 is provided on the part holding jig 1. The tool plate 4T can be attached to and detached from the master plate 4M by sending a pneumatic or electric signal to the master plate 4M. Details of the part holding jig 1 will be described later.

The mounting robot 400 has an articulated arm mechanism. The tip of the arm of the mounting robot 400 is equipped with a welding torch 2. The arm of the mounting robot 400 is equipped with a wire supply device (not shown) for supplying a welding wire to the welding torch 2.

In addition to the above-mentioned constituent elements, the robot system 100 includes an air supply device 320, such as a compressor, for supplying air to the part holding jig 1, a welding power source 420 for supplying drive power to the welding torch 2 and the wire supply device, a part supply robot control device 330 for controlling the operation of the part supply robot 300 and controlling the operation of the part holding jig 1, a mounting robot control device 430 for controlling the operation of the mounting robot 400 and controlling the welding power source 420, and an overall control device 500 for performing overall control on the part supply robot control device 330 and the mounting robot control device 430.

The part supply robot control device 330 includes a storage device, such as an HDD, storing a part supply program for controlling the operations of the part supply robot 300 and the part holding jig 1, an arithmetic processing device, such as a CPU, for executing the program stored in the storage device, and the like. By the arithmetic processing device executing the part supply program, the part supply robot 300 can supply the part P to the workpiece W in accordance with a part supply sequence specified by the part supply program, and the part holding jig 1 can hold the part P at the mounting position on the workpiece W.

The mounting robot control device 430 includes a storage device, such as an HDD, storing a part mounting program for controlling the operations of the mounting robot 400 and the welding torch 2, an arithmetic processing device, such as a CPU, for executing the program stored in the storage device, and the like. By the arithmetic processing device executing the part mounting program, the mounting robot 400 operates in synchronization with the welding torch 2 in accordance with a welding sequence specified by the part mounting program, so that the part P can be welded to the workpiece W.

The overall control device 500 includes a storage device, such as an HDD, storing an overall control program for controlling the operation start timings of the part supply robot 300 and the mounting robot 400, an arithmetic processing device, such as a CPU, for executing the control program stored in the storage device, and the like. By the arithmetic processing device executing the overall control program, the part supply robot 300 and the mounting robot 400 can be operated in synchronization.

Figure 2:
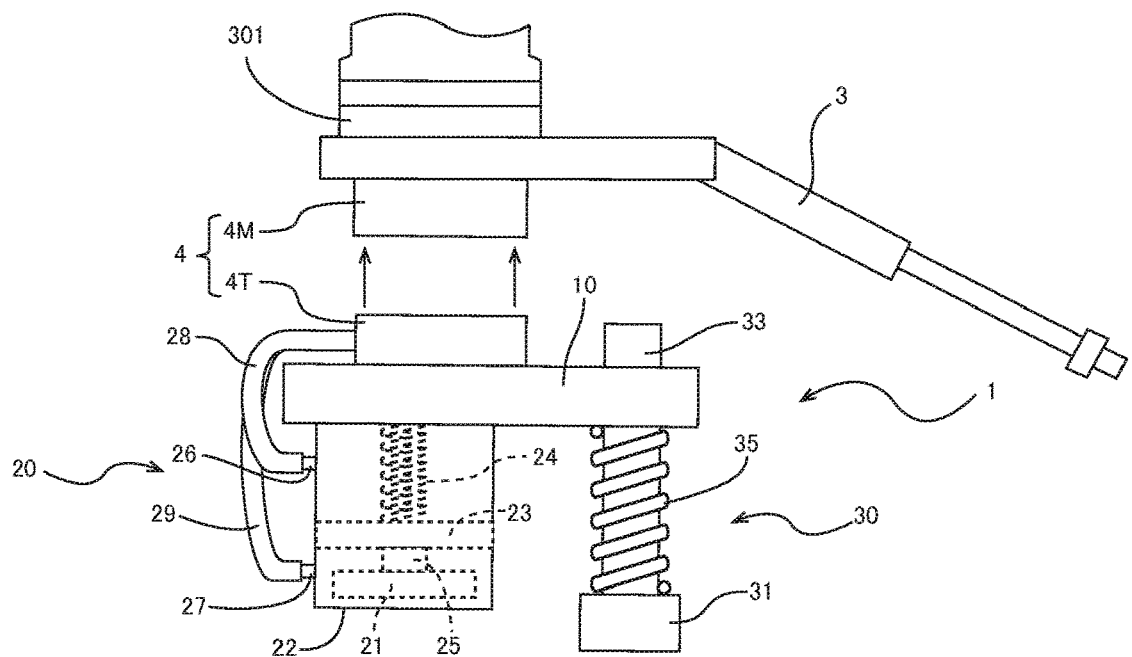
FIG. 2 is a side view showing an example of a part holding jig shown in FIG. 1.

As shown in FIG. 2, the part holding jig 1 includes a tool plate 4T detachably attached to the master plate 4M of the tool changer 4. The part holding jig 1 is detachably attached to the part supply robot 300 via the tool changer 4. The tool plate 4T is provided on the upper surface of a plate-shaped base 10. The base 10 is provided with a pull/release mechanism 20 which is pulled onto the workpiece W and released from the workpiece W, and a part pressing mechanism 30 which presses the part P against the workpiece W in a state where the pull/release mechanism 20 is pulled onto the workpiece W.

The part pressing mechanism 30 includes a rod 33 which is supported to be vertically movable within a predetermined movable range with respect to the base 10. A contact 31, such as an elastic body, which is brought into contact with the part P is attached to the tip of the rod 33. A compression coil spring 35 is inserted into the rod 33. The compression coil spring 35 is press-fitted between the base 10 and the contact 31. When the rod 33 is at the lowest position, the bottom surface of the contact 31 protrudes below the bottom surface of a cylinder 22.

The pull/release mechanism 20 includes a magnet 21 and a magnet support mechanism for supporting the magnet 21 to be vertically movable. The magnet support mechanism includes a cylindrical cylinder 22 and a piston 23 which slides inside the cylinder 22. The upper and lower ends of the cylinder 22 are closed, and the interior of the cylinder 22 is separated into an upper space and a lower space by the piston 23. The piston 23 is urged downward together with the magnet 21 by a piston urging mechanism. Typically, a compression coil spring 24 is applied as the piston urging mechanism. The upper end of the compression coil spring 24 is connected to the upper surface of the upper space of the cylinder 22, and the other end thereof is connected to the upper surface of the piston 23. The magnet 21 is fixed to the lower surface of the piston 23 via a pin 25. The magnet 21 is suspended from the upper surface of the piston 23 by the compression coil spring 24.

A double-acting type is employed as the driving system of the piston 23. A port 26 to which an air tube 28 is connected is provided on the side wall of the upper space of the cylinder 22, and a port 27 to which an air tube 29 of another system is connected is provided on the side wall of the lower space of the cylinder 22. By independently switching between air supply and air discharge of the two ports 26, 27, the magnet 21 can be pushed downward and pulled upward together with the piston 23. Thus, by supplying and stopping (discharging) air from an external compressor via the master plate 4M, pulling and releasing of the magnet 21 onto and from the workpiece W can be externally operated. The driving system of the piston 23 may be a single-acting type.

Switching between air supply and air discharge of the two ports 26, 27 in the part holding jig 1 is realized by air operation through the master plate 4M with the part holding jig 1 installed on the part supply robot 300. Specifically, a solenoid valve is provided on the air piping path from the air supply device 320 to the part holding jig 1, at the tip of the arm of the part supply robot 300 or the master plate 4M. By the part supply robot control device 330 opening and closing control of the solenoid valve, switching between air supply and air discharge of the two ports 26, 27 can be performed.

When air is supplied into the cylinder 22 through the upper port 26 and air inside the cylinder 22 is discharged through the lower port 27, the magnet 21 is pushed downward together with the piston 23 and is disposed at the bottom of the cylinder 22.

When air is discharged from the upper space inside the cylinder 22 through the upper port 26 and air is supplied to the lower space inside the cylinder 22 through the lower port 27, the magnet 21 is pulled upward together with the piston 23 and is disposed in an upper part of the cylinder 22.

When no air is supplied into the cylinder 22 from either of the two ports 26, 27, the piston 23 is urged downward by the compression coil spring 24. The magnet 21 is pressed against the bottom surface of the cylinder 22.

The operation to hold the part P by the part holding jig 1 will be described with reference to FIGS. 3 to 5.

Figure 3:
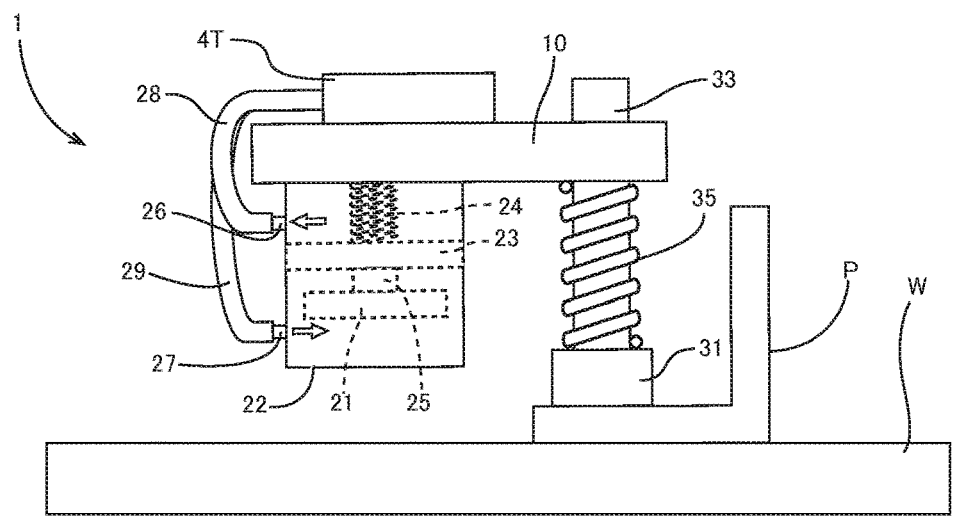
FIG. 3 shows the position of a magnet when the part holding jig shown in FIG. 2 is transferred.
Figure 4:
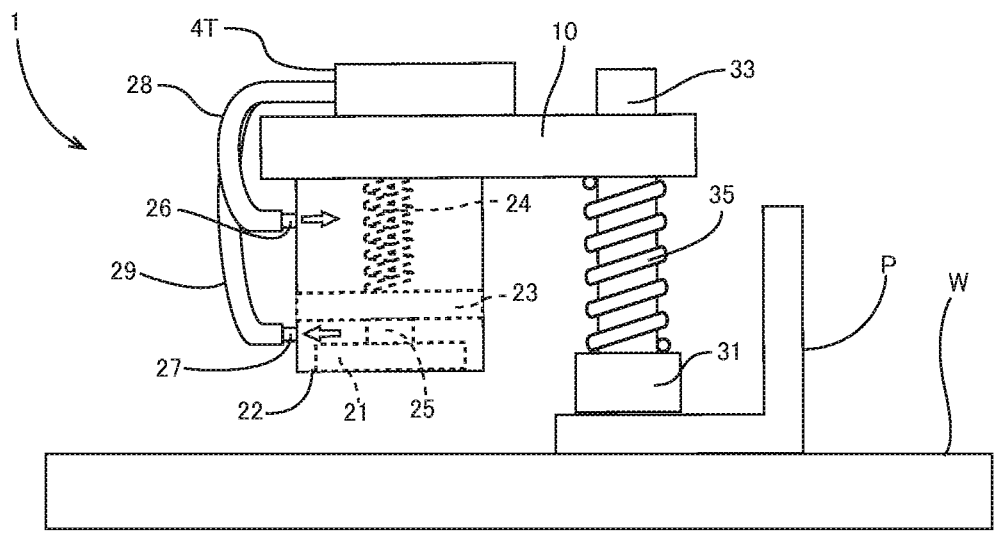
FIG. 4 shows the position of the magnet immediately after the start of a part holding operation of the part holding jig shown in FIG. 2.

As shown in FIG. 3, the dimensions of each element of the part holding jig 1 are determined so that there is a gap between the bottom surface of the cylinder 22 and the surface of the workpiece W with the contact 31 in contact with the part P placed on the workpiece W. While the part holding jig 1 is transferred by the part supply robot 300, air is discharged from the upper interior space of the cylinder 22 through the upper port 26, and air is supplied to the lower interior space of the cylinder 22 through the lower port 27. The magnet 21 of the part holding jig 1 is thereby pushed to an upper part inside the cylinder 22 together with the piston 23. As shown in FIG. 3, even when the contact 31 of the part holding jig 1 is in contact with the part P placed on the workpiece W, the magnet 21 is disposed in the upper part inside the cylinder 22 so that the distance between the magnet 21 and the workpiece W becomes longer and the force (pulling force) by which the workpiece W and the magnet 21 attract each other becomes weak. Therefore, the cylinder 22 is not attracted to the workpiece W.

Switching between air supply and air discharge of the two ports 26, 27 is performed with the contact 31 of the part holding jig 1 in contact with the part P placed on the workpiece W. That is, air is supplied from the upper port 26 to the upper interior space of the cylinder 22, and air in the lower interior space of the cylinder 22 is discharged from the lower port 27. The magnet 21 of the part holding jig 1 is thereby pulled down to a lower part inside the cylinder 22 together with the piston 23. Since the magnet 21 is disposed at the bottom of the cylinder 22, the distance between the magnet 21 and the workpiece W becomes short, and the force (pulling force) by which the workpiece W and the magnet 21 attract each other becomes strong. The magnetic force of the magnet 21 and the spring coefficient of the compression coil spring 35 are predetermined so that the pulling force can maintain the compressed state against the restoring force of the compression coil spring 35 of the part pressing mechanism 30. The part holding jig 1 is attracted and pulled onto the workpiece W together with the cylinder 22 against the restoring force of the compression coil spring 35 of the part pressing mechanism 30.

Figure 5:
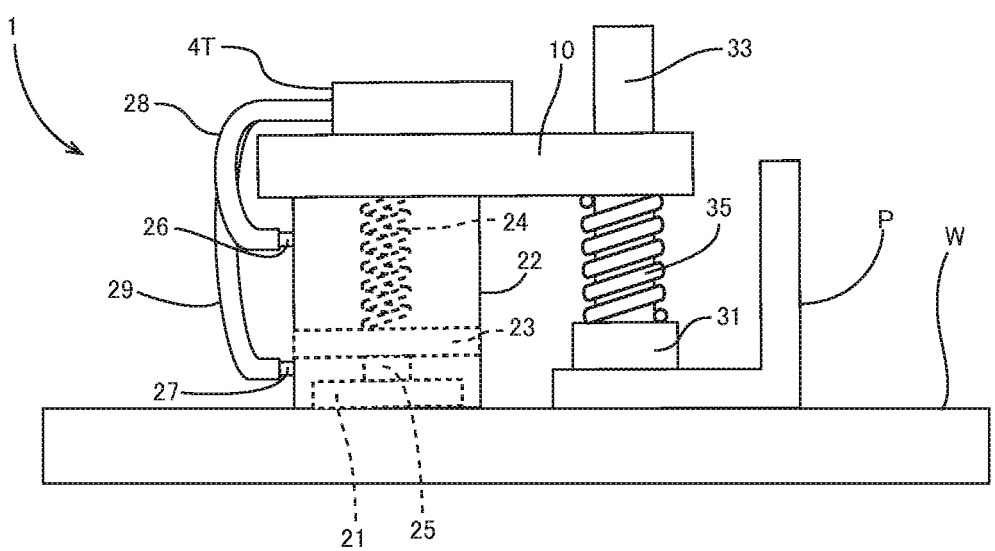
FIG. 5 shows a state where a part is held by the part holding jig shown in FIG. 2.
Figure 6:
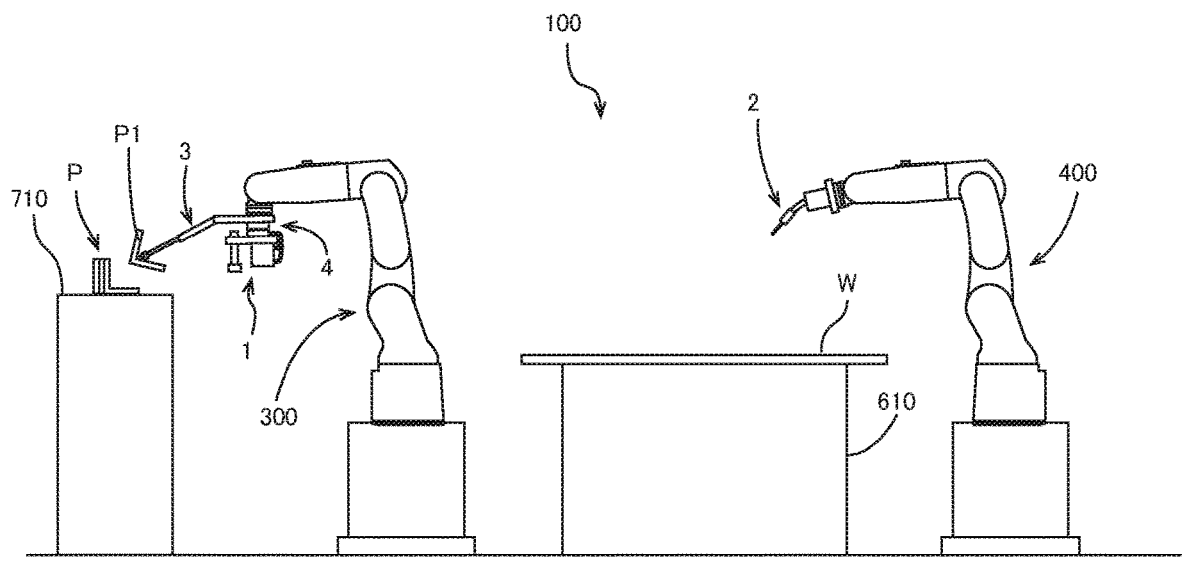
FIG. 6 shows a first stage of a welding operation by the robot system shown in FIG. 1.
Figure 7:
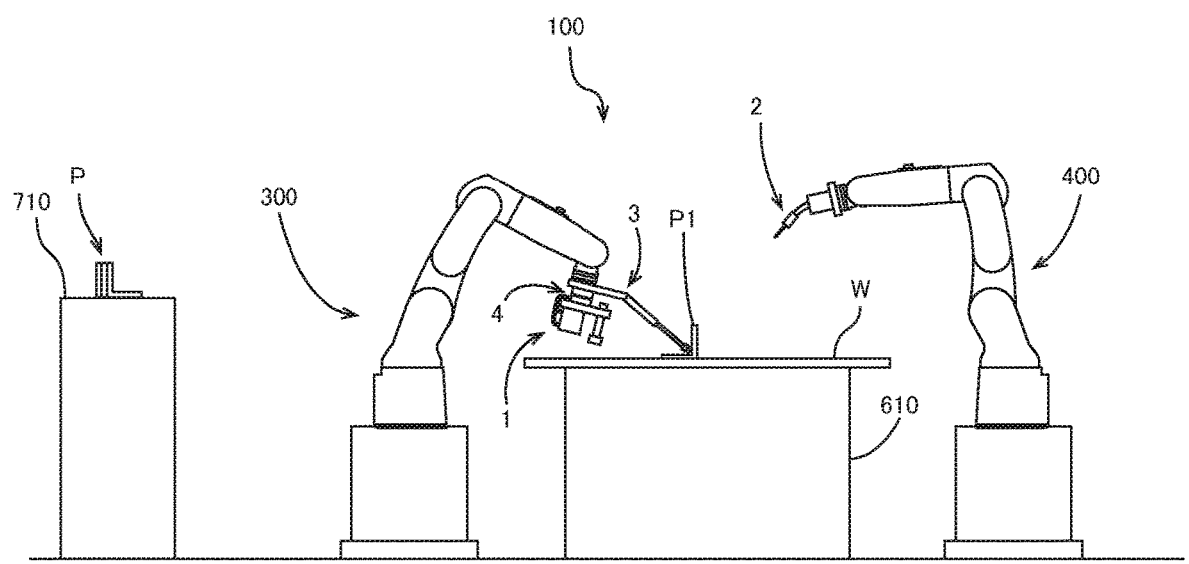
FIG. 7 shows a second stage of the welding operation by the robot system shown in FIG. 1.
Figure 8:
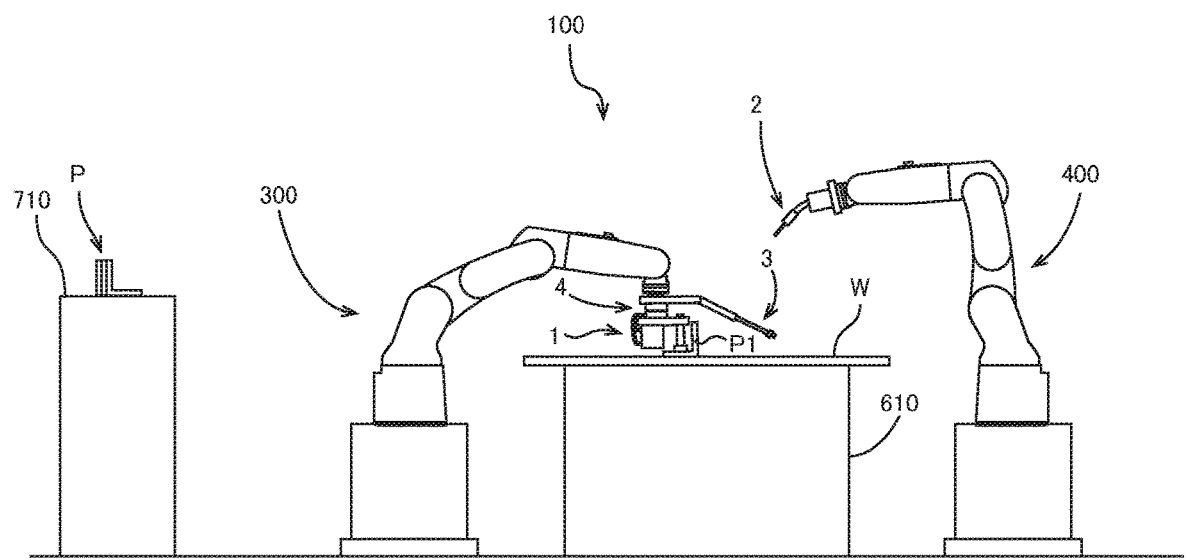
FIG. 8 shows a third stage of the welding operation by the robot system shown in FIG. 1.

As shown in FIG. 5, when the part holding jig 1 is attracted to the workpiece W, the compression coil spring 35 is contracted. The distance by which the compression coil spring 35 is contracted is equivalent to the distance by which the part holding jig 1 is attracted to the workpiece W. The contact 31 presses the part P against the workpiece W by the urging force of the compression coil spring 35, and thereby can hold the part P at the mounting position on the workpiece W.

A procedure of welding a plurality of parts P1, P2, . . . to the workpiece W by the robot system 100 will be described below with reference to FIGS. 6 to 13.

First, the part supply robot 300 is equipped with the part holding jig 1 via the tool changer 4 provided at the tip of the arm. The part supply robot 300 picks up a part P1 from the part supply table 710 with the part gripping hand 3 provided at the tip of the arm (see FIG. 6), conveys the part P1, together with the part holding jig 1, to the mounting position of the part P1 on the workpiece W, and releases the part P1 at the mounting position (see FIG. 7). Next, the part supply robot 300 transfers the part holding jig 1 to a position above the part P1 placed at the mounting position, lowers the part holding jig 1 toward the part P1, and brings the contact 31 of the part holding jig 1 into contact with the part P (see FIG. 8). In the stages shown in FIGS. 6 to 8, the magnet 21 of the part holding jig 1 is disposed at a position away from the bottom of the interior of the cylinder 22 (see FIG. 3).

Figure 9:
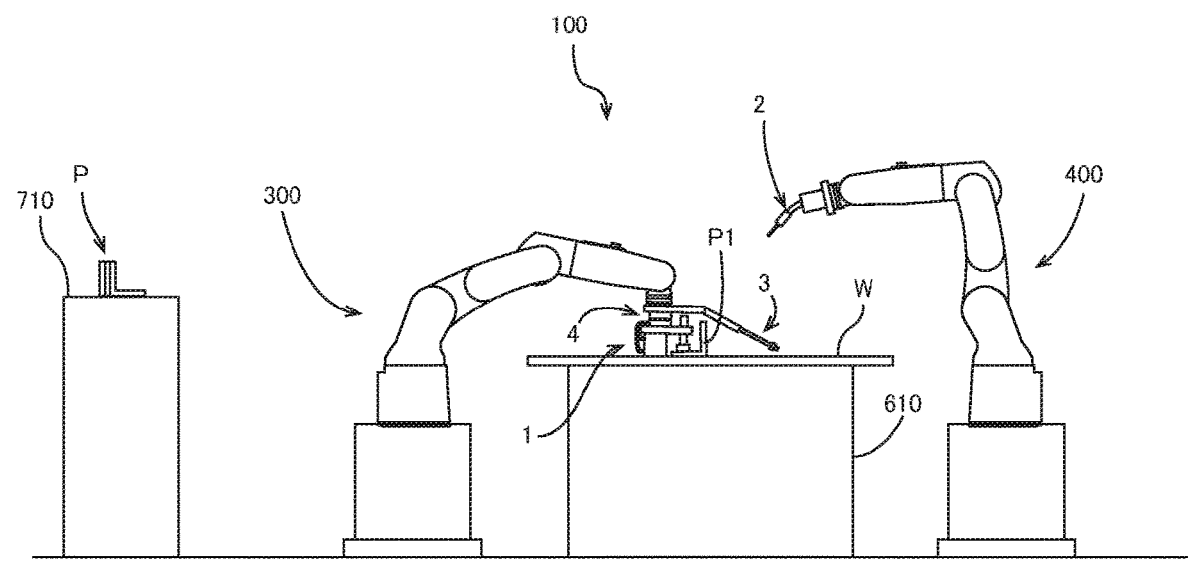
FIG. 9 shows a fourth stage of the welding operation by the robot system shown in FIG. 1.

Switching between air supply and air discharge of the two ports 26, 27 is performed with the contact 31 of the part holding jig 1 in contact with the part P1, whereby the part P1 is held at the mounting position on the workpiece W by the part pressing mechanism 30 of the part holding jig 1 (see FIG. 9). At this time, it is desirable that a soft float function of the part supply robot 300 is enabled. Thus, the tip of the arm of the part supply robot 300 can be attracted to the workpiece W together with the part holding jig 1, and the position of the tip of the arm after being attracted can be acquired. Accordingly, the part supply robot control device 330 can continue to control the part supply robot 300.

Figure 10:
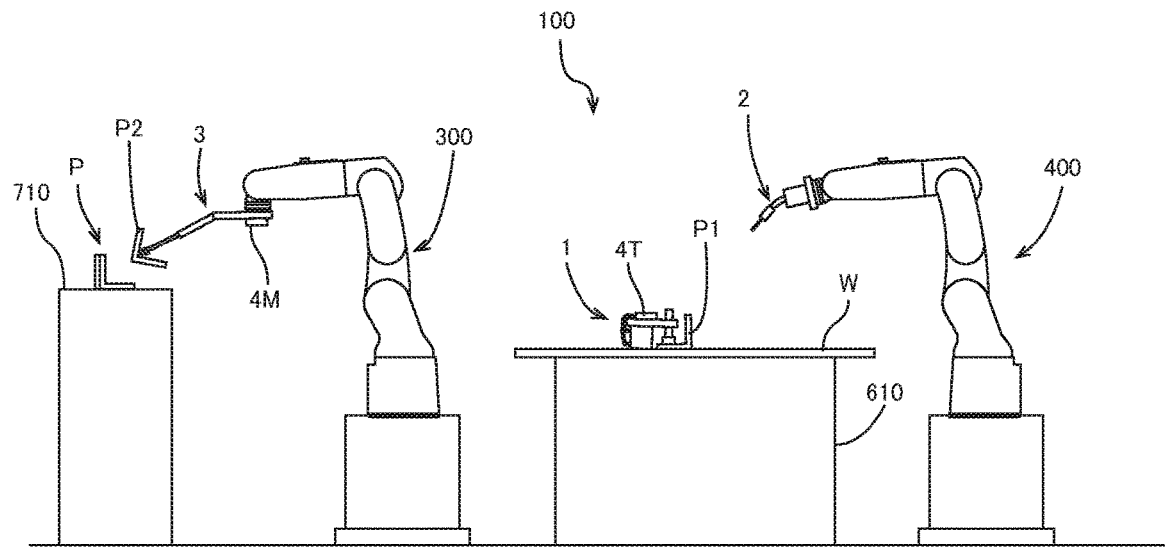
FIG. 10 shows a fifth stage of the welding operation by the robot system shown in FIG. 1.
Figure 11:
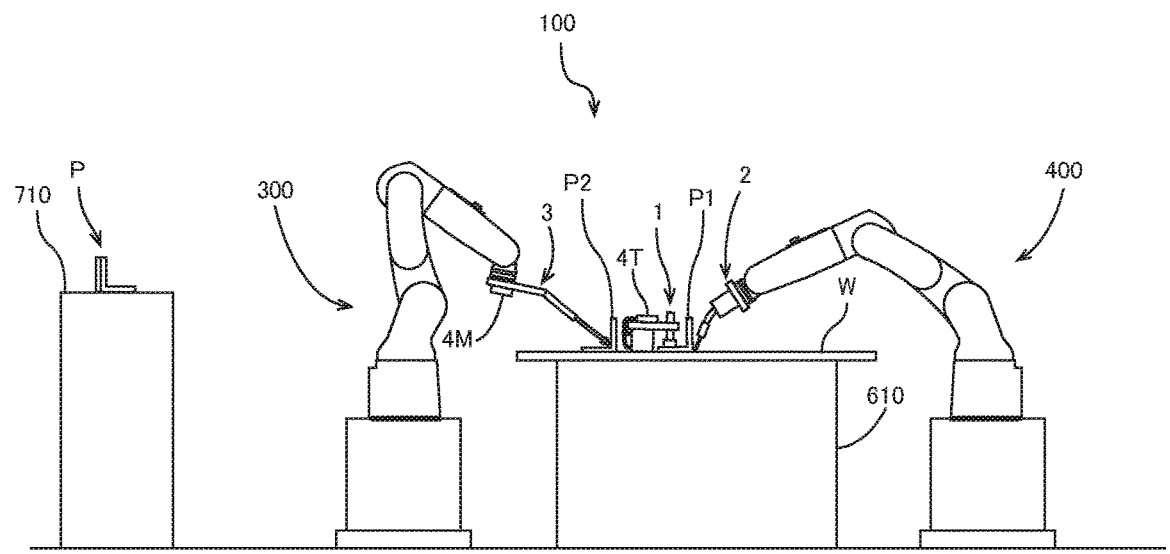
FIG. 11 shows a sixth stage of the welding operation by the robot system shown in FIG. 1.
Figure 12:
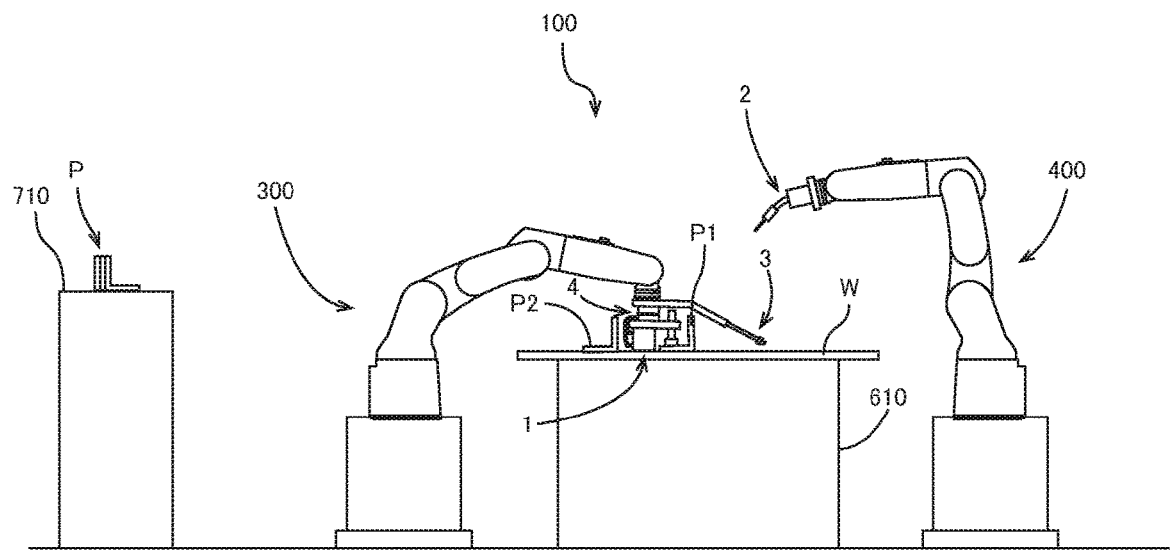
FIG. 12 shows a seventh stage of the welding operation by the robot system shown in FIG. 1.
Figure 13:
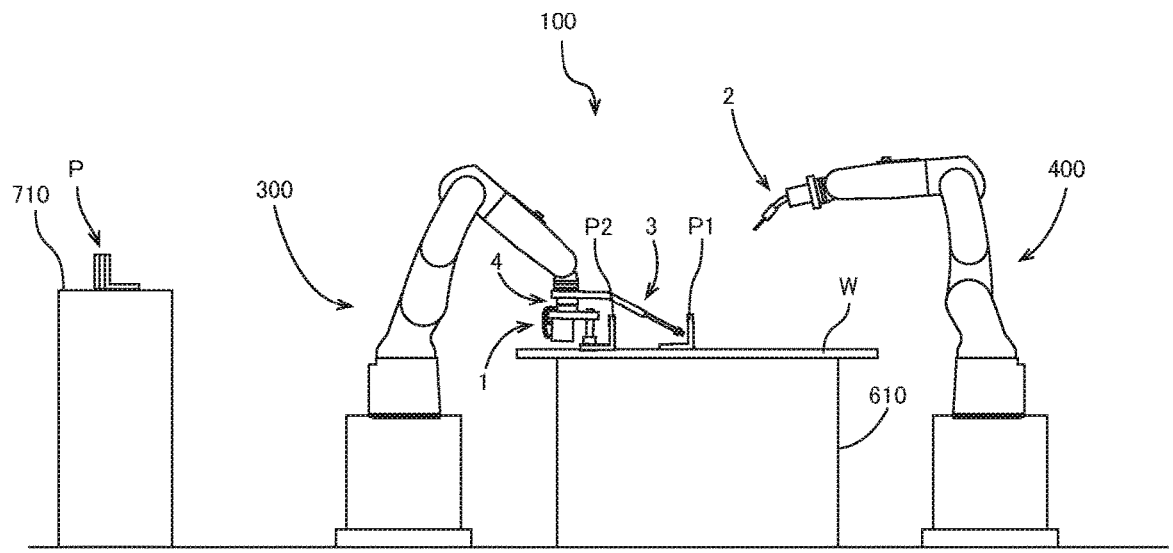
FIG. 13 shows an eighth stage of the welding operation by the robot system shown in FIG. 1.

After the part is held by the part holding jig 1, the part supply robot 300 separates the part holding jig 1 therefrom and withdraws the arm (see FIG. 10). Before separating the part holding jig 1 from the part supply robot 300, the solenoid valve on the air piping path from the tool changer 4 to the two ports 26, 27 is closed by the part supply robot control device 330 so that air does not leak from the inside of the cylinder 22 even when the part supply robot 300 is separated. As a result, the part holding jig 1 can maintain the state where the part P1 is held at the mounting position of the workpiece W even after being separated from the part supply robot 300. The magnet 21 is originally urged by the compression coil spring 24 together with the piston 23 so that it is disposed in the lower interior of the cylinder 22. Therefore, even if air leaks from the two ports 26, 27, the state of being pulled onto the workpiece W by the pull/release mechanism 20 can be maintained, so that the situation in which the part P1 moves during welding can be avoided.

After the part holding jig 1 is separated by the part supply robot 300, the mounting robot 400 attaches the part P1 held by the part holding jig 1 to the workpiece W by welding. The part supply robot 300 picks up the next part P2 and conveys it to the next mounting position while the mounting robot 400 is performing the mounting operation on the workpiece W (see FIG. 11). The mounting robot 400 withdraws the arm after completing the mounting operation. The part supply robot 300 is equipped with the part holding jig 1 holding the part P1 whose mounting operation has been completed (see FIG. 12), switches between air supply and air discharge of the two ports 26, 27, and releases the holding state of the part P1 by the part holding jig 1. The part supply robot 300 transfers the part holding jig 1 to a position above the already transferred part P2, lowers the part holding jig 1 toward the part P2, and brings the contact 31 of the part holding jig 1 into contact with the part P2 (see FIG. 13). The part supply robot 300, the part holding jig 1, and the mounting robot 400 repeatedly execute the operation procedure described with reference to FIGS. 9 to 13 until the mounting operation of all the parts P on the workpiece W is completed.

The part holding jig 1 described in the present embodiment can hold the part P on the workpiece W by itself and by pulling; therefore, when the part is mounted on the workpiece W, it is possible to relax the restrictions on the places where the part can be mounted.

In addition, the part holding jig 1 presses the part P against the workpiece W by the urging force of the contracted compression coil spring 35; therefore, the holding force of the part P on the workpiece W can be increased and the part P can be held firmly. Further, the part holding jig 1 does not have many functions, and only needs to have the pull/release mechanism 20 which is pulled onto and released from the workpiece W and the part pressing mechanism 30 which presses the part P against the workpiece W. Moreover, the pull/release operation by the pull/release mechanism 20 can be realized by the vertical movement of the magnet 21 inside the cylinder 22, and the pressing operation of the part P by the part pressing mechanism 30 can be realized by the urging force of the compression coil spring 35, and neither of them has a complicated structure. The power for contracting the compression coil spring 35 is obtained by utilizing the force of the entire part holding jig 1 being attracted to the workpiece W by the pull/release mechanism 20, and a driving source, such as a motor, for contracting the compression coil spring 35 is unnecessary. Thus, it can be said that the part holding jig 1 according to the present embodiment has a very simple structure.

Further, even when the part holding jig 1 is separated from the part supply robot 300, it can maintain the holding state of the part P on the workpiece W by itself. Therefore, by separating therefrom the part holding jig 1 holding the part P at the mounting position on the workpiece W, the part supply robot 300 can execute other operations, such as conveying the next part to the mounting position, while the mounting robot 400 is welding the part P to the workpiece W. Thus, the cycle time of the welding operation can be shortened, and the work efficiency can be improved.

In the present embodiment, the robot system 100 has been described as having two robots. However, if the cycle time is acceptable, the system can be constructed with only one robot by switching between the part holding jig 1 and the welding torch 2.

In the present embodiment is an example of attaching the part P to the workpiece W by welding has been described; however, since the part holding jig 1 temporarily fixes the part P to the workpiece W, the method of fixing the part P to the workpiece W is not limited to arc welding. Depending on the method of fixing the part P to the workpiece W, the welding torch 2 can be replaced by, for example, a device, such as a glue gun, for bonding with a resin melted by heat, a device for applying an adhesive, or an ultrasonic welding machine using ultrasonic waves.

Figure 14:
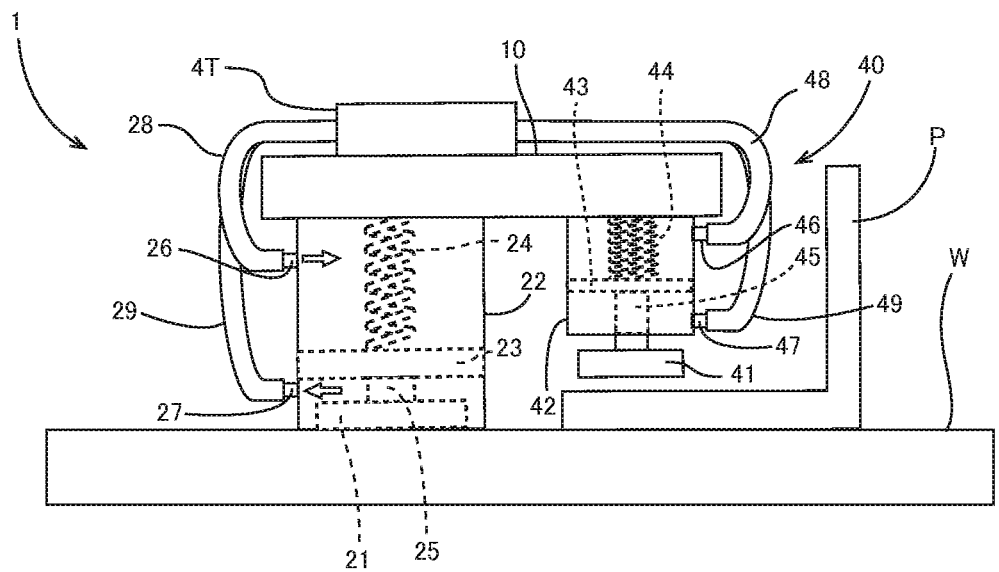
FIG. 14 is a side view showing another example of the part holding jig shown in FIG. 1.

In the present embodiment, an example in which the compression coil spring 35 is used as the part pressing mechanism 30 has been described; however, the configuration of the part pressing mechanism 30 is not limited to the above structure as long as the part P can be pressed against the workpiece W. For example, an air cylinder can be used in place of the compression coil spring 35. As shown in FIG. 14, a part pressing mechanism 40 includes a cylinder 42, a piston 43, and a contact 41 coupled to the piston 43 via a rod 45 passed through a sealed hole in the bottom surface of the cylinder 42. The piston 43 is suspended inside the cylinder 42 by a compression coil spring 44. Two ports 46, 47 are opened on the side of the cylinder 42. Air tubes 48, 49 extending from the tool changer 4 are connected to the two ports 46, 47, respectively. Similarly to the pull/release mechanism 20, by separately operating air supply and air discharge of the two ports 46, 47 provided in the cylinder 42, the contact 41 can be pressed against the part P and released from the part P. Thus, it is possible to switch between holding the part P on the workpiece W and releasing the holding state of the part P on the workpiece W.

According to the part pressing mechanism 40 configured as described above, after the position of the part holding jig 1 is fixed with respect to the workpiece W by the pull/release mechanism 20, switching between air supply and air discharge of the ports 46, 47 is performed, and the piston 43 is moved downward, whereby the contact 41 is pressed against the part P and the part P can be held at the mounting position on the workpiece W. Since the pulling operation by the pull/release mechanism 20 and the pressing operation by the part pressing mechanism 40 can be performed separately, the stroke length of the contact 41 of the part pressing mechanism 40 can be adjusted in accordance with the type of the part, the mounting position thereof, and the like. Therefore, the versatility can be improved.

Figure 15:
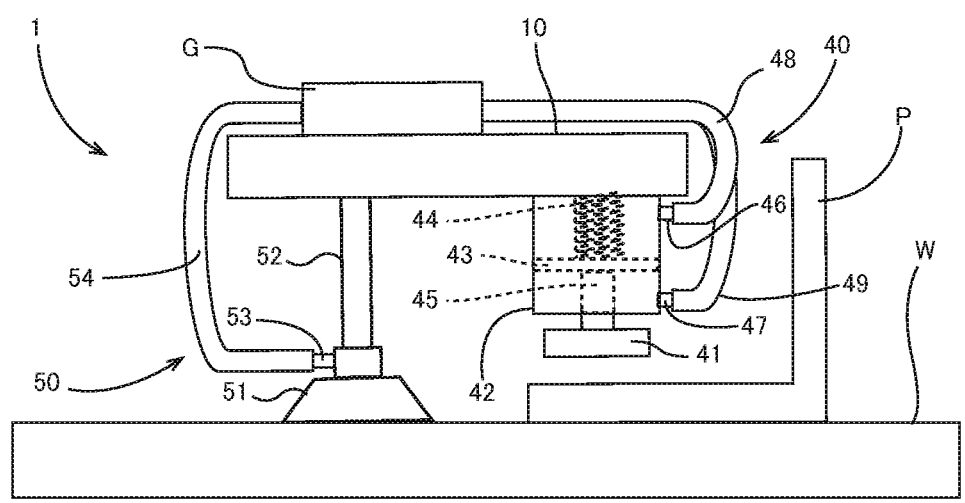
FIG. 15 is a side view showing another example of the part holding jig shown in FIG. 1.
Figure 16:
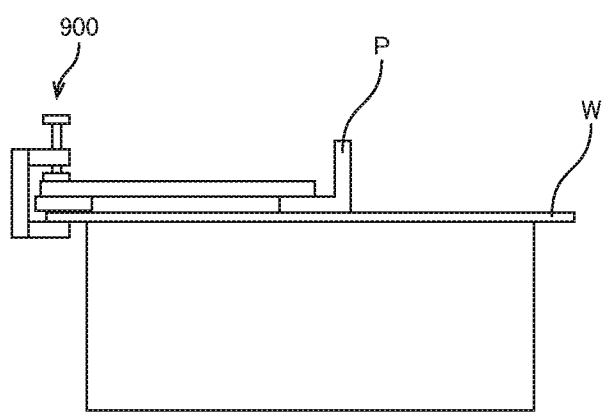
FIG. 16 shows a conventional example.

When the part pressing mechanism 40 using an air cylinder is employed, a suction pad can be used in place of the magnet 21 of the pull/release mechanism 20. As shown in FIG. 15, a pull/release mechanism 50 includes a suction pad 51. The suction pad 51 is connected to the base 10 via a rod 52. The suction pad 51 is provided with a port 53 to which an air tube 54 is connected. Air in a space defined by the suction pad 51 and the workpiece W is discharged with the suction pad 51 in contact with the workpiece W, whereby the suction pad 51 is pulled onto the workpiece W and the part holding jig 1 can be fixed to the workpiece W. In order to prevent air leakage when the tool changer 4 is separated, it is necessary to construct piping using a check valve or the like. After the position of the part holding jig 1 with respect to the workpiece W is fixed by the pull/release mechanism 50 configured as described above, the part pressing mechanism 40 can press the part P against the workpiece W and temporarily fix the part P. Since the position of the part holding jig 1 can be fixed with respect to the workpiece W without utilizing the pull by the magnet 21, the part P can be temporarily fixed to the workpiece W even when the workpiece W is a non-magnetic material or when the magnet 21 cannot be used due to restrictions by the use environment.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot system comprising:
a part supply robot configured to supply a part to a workpiece;
a hand, disposed at a tip of an arm of the part supply robot, configured to grip the part;
a part holding jig configured to hold the part on the workpiece; and
a mounting robot configured to attach the part to the workpiece,
wherein:
the part holding jig is detachably attached to the tip of an arm of the part supply robot;
the part holding jig comprises a pull/release mechanism configured to be detachable and attachable to the workpiece, and a part pressing mechanism configured to hold the part on the workpiece;
the part holding jig is transferred together with the part by the part supply robot, in a state where the part is held by the hand;
after the part holding jig is transferred together with the part, the part is released from the hand;
after the part is released from the hand, the part holding jig holds the part on the workpiece, thereby supporting the mounting robot to mount the part on the workpiece; and
the robot system includes a detachment/attachment mechanism that comprises a master plate disposed at an end of the arm and a tool plate disposed at the part holding jig, such that the detachment/attachment mechanism causes the part holding jig to be attached to and detached from the end of the arm, by supplying and stopping pneumatic or electrical signals to the master plate.

2. The robot system according to claim 1, wherein the pull/release mechanism includes a magnet, and a support mechanism for supporting the magnet so as to be movable in directions of approaching and separating from the workpiece.

3. The robot system according to claim 2, wherein
the support mechanism includes a cylinder and a piston, and
an operation of supplying air to the cylinder via the master plate switches between separating the magnet from the workpiece and pulling the magnet onto the workpiece.

4. The robot system according to claim 3, wherein a spring for urging the piston, together with the magnet, in the direction of approaching the workpiece is provided in the cylinder.

5. The robot system according to claim 1, wherein the part pressing mechanism includes a contact brought into contact with the part and a compression spring for pressing the contact against the workpiece.

6. A part holding jig for holding a part supplied by a part supply robot at a mounting position with respect to a workpiece, the part holding jig comprising:
- a tool plate detachably attached to a master plate of a tool changer provided at a tip of an arm of the part supply robot;
- a pull/release mechanism attached to the tool plate and pulled onto and released from the workpiece in accordance with an operation via the master plate; and
- a part pressing mechanism coupled to the pull/release mechanism for pressing the part against the workpiece in a state where the pull/release mechanism is pulled onto the workpiece, wherein:
- the pull/release mechanism comprises a cylinder, and a piston and a magnet attached to the piston, which are movable together in the cylinder;
- the pull/release mechanism is configured to supplying air to the cylinder through a supply port and discharging air from the cylinder through a discharge port, thereby moving the piston and the magnet together in the cylinder;
- the supply port and the discharge port are disposed at front and back positions of the piston, respectively, on a side wall along a moving direction of the piston; and
- movement of the magnet switches between separating the magnet from the workpiece and pulling the magnet onto the workpiece.

* * * * *